July 31, 1923.
J. M. PAUL
FLYTRAP
Filed Nov. 25, 1921
1,463,659
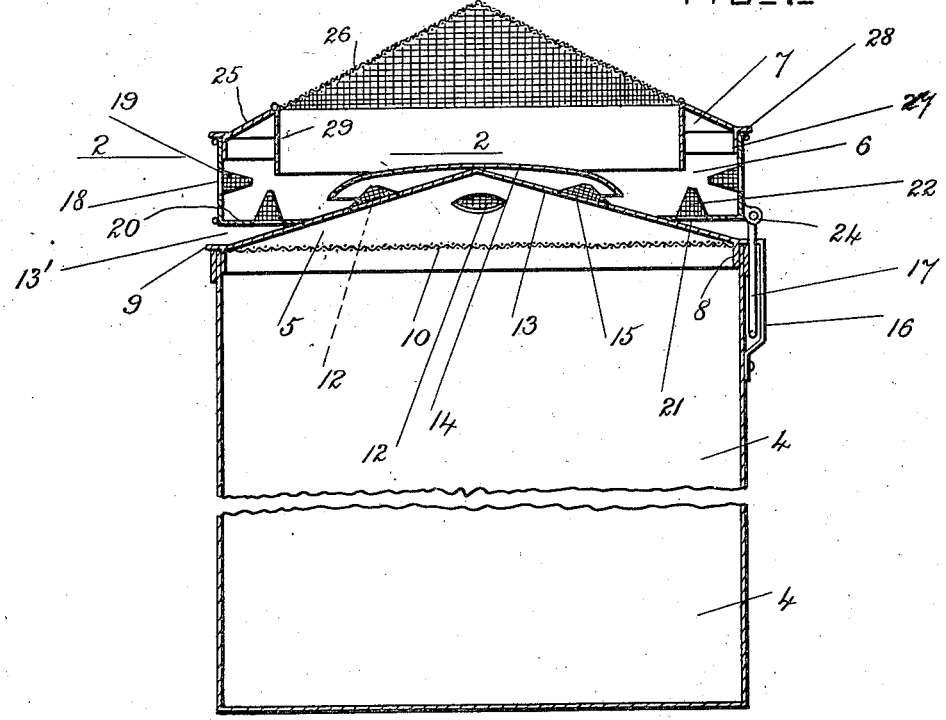
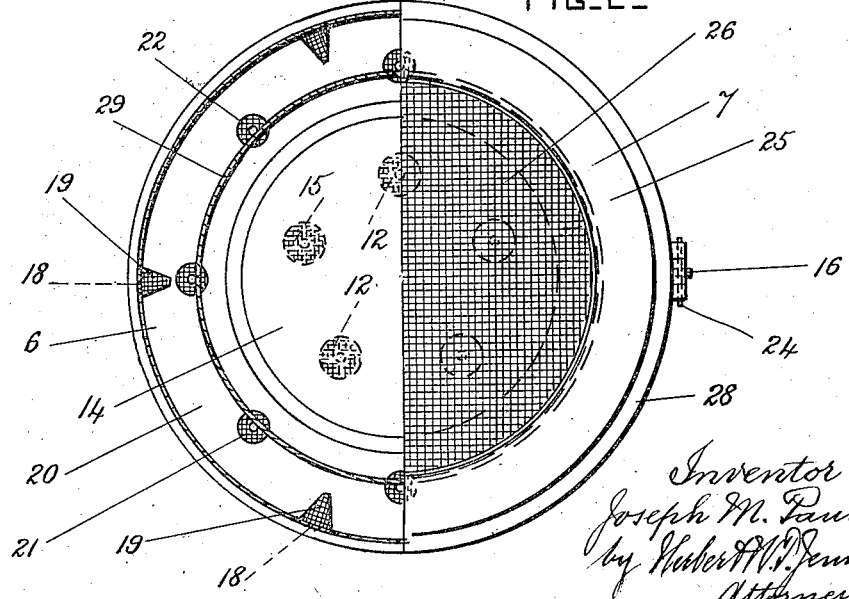
Inventor
Joseph M. Paul.
by Hubert W. F. Jenner
Attorney.

Patented July 31, 1923.

1,463,659

UNITED STATES PATENT OFFICE.

JOSEPH M. PAUL, OF RICE LAKE, WISCONSIN.

FLYTRAP.

Application filed November 25, 1921. Serial No. 517,767.

*To all whom it may concern:*

Be it known that I, JOSEPH M. PAUL, a citizen of the United States, residing at Rice Lake, in the county of Barron and State of Wisconsin, have invented certain new and useful Improvements in Flytraps, of which the following is a specification.

This invention relates to traps for catching flies; and it consists in a trap constructed as hereinafter fully described and claimed and adapted to form the cover of a garbage can and to be used in combination with the garbage can.

In the drawings, Figure 1 is a vertical section through a garbage can provided with a cover which forms a fly trap and which is constructed according to this invention. Fig. 2 is a plan view of the same partially in section on the line 2—2 in Fig. 1.

The garbage can 4 is a cylindrical vessel of any approved construction and size. The fly trap which forms the cover of the garbage can comprises a lower section 5, an entrance ring 6, and an upper section 7. The lower section 5 has a cylindrical portion 8 which slides into the upper end portion of the can, and it has a flange 9 which rests on the edge of the can. The bottom 10 of the lower section is formed of woven screen wire, or other foraminous or perforated material, through which the flies cannot pass. A series of scent holes 12 is formed in the top 13 of the lower cover section, which is conical, and 14 is a hood secured a little above the scent holes to prevent rain from descending through them into the garbage can. The hood 14 is soldered or otherwise secured to the apex of the conical top 13 which forms the lid of the garbage can. Conical fly traps 15 of woven wire are secured over the scent holes.

A vertical bar 16 is secured to one side of the garbage can so as to form a loop, and a clevis-shaped link 17 straddles this bar and slides vertically in the loop, and is also free to move pivotally in the loop, and is pivoted at its upper end to the entrance ring 6. This link operates as a hinge, and permits the entrance ring of the fly trap to be raised and turned over clear of the top of the can.

The entrance ring 6 is cylindrical, and has holes 18 in its periphery which are provided with conical fly traps 19 of wire gauze. The bottom part of the entrance ring has an annular horizontal plate 20 secured to it and adapted to rest on the conical top 13 of the lower section around the rain hood 14. An inlet passage 13′ for flies is formed between the conical top 13 and the plate 20. This plate 20 has fly entrance holes 21 in it which are provided with trap cones or conical fly traps 22 of wire gauze. The entrance ring 6 is connected to the lower section 5 by a hinge 24 at the top of the link 17.

The upper section 7 has a conical top 25 the upper part 26 of which is formed of woven screen wire similar to the bottom 10 of the lower section. The upper section has a cylindrical portion 27 which is slidable in the entrance ring, and it has a flange 28 which rests on top of the entrance ring. The upper section 7 has also a cylindrical ring 29 which is secured to its top 25 around the base of the wire-work 26, and which projects a little below the bottom edge of the part 27. The ring 29 stiffens the top, and forms an annular space around the rain hood.

The conical fly traps or trap cones 15, 19 and 22, permit the flies to pass through them into the interior of the fly trap, but prevent them from passing out. The scent of the material in the garbage can rises through the screened scent openings, and attracts the flies so that they enter the trap through the conical fly traps or trap cones.

What I claim is:

1. A fly trap adapted to form the cover of a garbage can, said fly trap comprising an upper section, a conical lower section which forms the lid of the garbage can, and an intermediate entrance ring provided with entrance trap cones for the flies, said entrance ring having also an annular plate the inner edge of which rests on the conical lower section and forms with it an inlet passage for the flies, said upper and lower sections being also provided with screened openings which permit the scent of the garbage in the can to ascend through the entrance ring and upper section.

2. A fly trap adapted to form the cover of a garbage can, said trap comprising an upper section having a conical top provided with a screened scent opening, a lower section provided with a bottom of wire-work, and provided also with a top having screened scent openings and a rain hood over the scent openings, and an intermediate ring provided with entrance trap cones for the flies.

3. A fly trap adapted to form the cover of a garbage can, said trap comprising an upper section, a conical lower section, and an intermediate entrance ring, the said upper and lower sections being provided with screened scent openings, and the intermediate ring being provided with an annular plate the inner edge of which rests on the conical lower section and forms with it an inlet passage for the flies, the said plate and the periphery of the intermediate ring being provided with entrance trap cones for the flies.

In testimony whereof I have affixed my signature.

JOSEPH M. PAUL.